United States Patent
Hong

(10) Patent No.: US 7,149,489 B2
(45) Date of Patent: Dec. 12, 2006

(54) DIVERSITY APPARATUS AND METHOD FOR A MOBILE COMMUNICATION TERMINAL

(75) Inventor: Ic-Pyo Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 427 days.

(21) Appl. No.: 10/270,957

(22) Filed: Oct. 15, 2002

(65) Prior Publication Data
US 2003/0125078 A1    Jul. 3, 2003

(30) Foreign Application Priority Data
Dec. 27, 2001    (KR) .............................. P2001-85806

(51) Int. Cl.
*H04B 1/06*    (2006.01)
(52) U.S. Cl. .................. 455/269; 455/277.1; 455/101; 375/347
(58) Field of Classification Search ............... 455/269, 455/270, 272, 277.1, 277.2, 132, 133, 134, 455/135, 343.5, 522, 127.1, 129, 101, 344, 455/102, 103, 556.1, 456; 375/347, 348; 342/357.1; 343/700 R
See application file for complete search history.

(56) References Cited

U.S. PATENT DOCUMENTS

| | | | |
|---|---|---|---|
| 5,396,645 A * | 3/1995 | Huff | 455/441 |
| 5,603,107 A * | 2/1997 | Gottfried et al. | 455/133 |
| 5,697,075 A | 12/1997 | Kim | |
| 6,097,974 A * | 8/2000 | Camp et al. | 455/575.7 |
| 6,122,506 A * | 9/2000 | Lau et al. | 455/427 |
| 6,137,996 A | 10/2000 | Baumann | |
| 6,351,236 B1 * | 2/2002 | Hasler | 342/357.09 |
| 6,407,706 B1 * | 6/2002 | Vernon | 343/700 MS |
| 6,415,141 B1 * | 7/2002 | Kakura et al. | 455/277.1 |
| 6,433,734 B1 * | 8/2002 | Krasner | 342/357.09 |
| 6,662,021 B1 * | 12/2003 | Kang et al. | 455/553.1 |
| 6,690,322 B1 * | 2/2004 | Shamoto et al. | 342/357.1 |
| 6,694,150 B1 * | 2/2004 | Standke et al. | 455/552.1 |
| 2002/0045427 A1 * | 4/2002 | Lahti et al. | 455/97 |
| 2003/0050089 A1 * | 3/2003 | Ogino et al. | 455/552 |
| 2003/0181192 A1 * | 9/2003 | Park et al. | 455/335 |

FOREIGN PATENT DOCUMENTS

CN    1108831 A    9/1995

* cited by examiner

*Primary Examiner*—CongVan Tran
(74) *Attorney, Agent, or Firm*—Dilworth & Barrese LLP

(57) ABSTRACT

A diversity apparatus for a mobile communication terminal with a GPS function. The diversity apparatus comprises: a first multiband antenna with a first reception polarization characteristic, for receiving a combined RF signal of a GPS signal and a mobile communication signal; a second multiband antenna with a second reception polarization characteristic distinguished from the first reception polarization characteristic, for receiving a combined RF signal of a GPS signal and a mobile communication signal; and a switching diversity unit for selecting one of the RF signals received by the first and second multiband antennas.

16 Claims, 3 Drawing Sheets

US 7,149,489 B2

DIVERSITY APPARATUS AND METHOD FOR A MOBILE COMMUNICATION TERMINAL

PRIORITY

This application claims priority to an application entitled "Diversity Apparatus and Method for a Mobile Communication Terminal" filed in the Korean Industrial Property Office on Dec. 27, 2001 and assigned Ser. No. 2001-85806, the contents of which are hereby incorporated by reference.

BACKGROUND OF THE INVENTION

1. Field of the Invention

The present invention relates generally to a mobile communication terminal, and in particular, to a reception diversity apparatus and method for the mobile communication terminal.

2. Description of the Related Art

A mobile communication terminal, such as a CDMA (Code Division Multiple Access) cellular/PCS (Personal Communications Service) mobile terminal, a hand-held phone or an IMT-2000 (International Mobile Telecommunication 2000) terminal, transmits and receives information using an RF (Radio Frequency) signal. In particular, an advanced mobile communication terminal is equipped with a GPS (Global Positioning System) receiver for receiving, from a GPS satellite, absolute-time information necessary for worldwide time synchronization and position information necessary for calculating latitude/longitude. In addition, the mobile communication terminal is provided with separate antennas or a common antenna for its standard communication and GPS communication.

FIG. 1 illustrates a structure of a conventional CDMA mobile communication terminal receiver with a GPS function. As illustrated in FIG. 1, the conventional mobile communication terminal receiver comprises a combined GPS and CDMA multiband antenna (hereinafter referred to as "GPS/CDMA antenna") 110, a GPS/CDMA RF receiver 120 and a baseband processor 130.

Referring to FIG. 1, the GPS/CDMA antenna 110 receives a GPS RF navigation signal in a frequency band of 1575.42 MHz or 1227.6 MHz, and a CDMA RF signal in a frequency band of 900 MHz, 1.8 GHz, or 2 GHz. The RF receiver 120 converts the received GPS and CDMA RF signals into baseband signals. The baseband processor 130 extracts time and position information from the baseband GPS signal, and processes the baseband CDMA signal.

In a CDMA mobile communication system, the quality of an RF signal can vary greatly over a very short period of time depending on the propagation characteristics of an RF carrier signal, such as fading, echoes, and interference. To cope with this variation, typical mobile communication systems enable a mobile communication part (i.e., a mobile communication terminal) to obtain a diversity effect, by providing a corresponding stationary communication part (i.e., a base station) with a device for transmission and reception diversity.

However, this diversity device of the base station cannot cope with the propagation characteristics of a signal between the base station and the mobile communication terminal. Moreover, in a CDMA2000 system supporting a high data rate of 153.6 Kbps and over, the existing mobile communication terminal with a single antenna cannot sufficiently satisfy a required data rate, and a demand for an improvement in network link quality, which is required due to an increase in the number of subscribers. For the purpose of solving these problems, many techniques for obtaining a diversity effect in a mobile communication terminal have been disclosed. One of the techniques is to equip the mobile communication terminal with two antennas and two RF receivers, to receive two signals and to combine the two received signals in a baseband processor.

FIG. 2 illustrates a structure of a conventional CDMA mobile communication terminal receiver with GPS and diversity functions. As illustrated in FIG. 2, the conventional mobile communication terminal comprises a GPS antenna 210, a GPS RF receiver 220, first and second CDMA antennas 212 and 214, first and second CDMA RF receivers 222 and 224, and a baseband processor 230.

Referring to FIG. 2, the GPS antenna 210 receives a GPS RF navigation signal in a frequency band of 1575.42 MHz or 1227.6 MHz, and the GPS RF receiver 220 converts the received GPS RF navigation signal into a baseband signal. Each of the first and second CDMA antennas 212 and 214 receives a CDMA RF signal in a frequency band of 900 MHz, 1.8 GHz, or 2 GHz, and each of the first and second CDMA RF receivers 222 and 224 converts the received CDMA RF signal into a baseband signal. The baseband processor 230 extracts time and position information from the baseband GPS signal provided from the GPS RF receiver 220, and combines and processes first and second baseband CDMA signals provided from the first and second CDMA RF receivers 222 and 224.

Using the above diversity scheme with two antennas and two RF receivers, the baseband processor 230 needs a special algorithm for combining multiple baseband reception signals. In particular, this process should be performed very rapidly in the CDMA2000 system supporting a high data rate. An MRC (Maximal Ratio Combining) diversity technique, an IRC (Interference Rejection Combining) diversity technique, and many other techniques have been used as an adaptive combining diversity technique used in a mobile communication terminal demanding high-speed data processing. Referring to FIG. 2, the baseband processor 230 includes an MRC algorithm processor 232 for the adaptive combining diversity.

However, in a small-sized mobile communication terminal, even though two antennas are used for a diversity effect, it is difficult to obtain a sufficient space diversity effect. Moreover, the use of two antennas and two RF receivers in a mobile communication terminal hinders miniaturization, integration and increases the cost of the mobile communication terminal.

SUMMARY OF THE INVENTION

It is, therefore, an object of the present invention to provide a reception apparatus and method for decreasing the influence of fading, interference and echo phenomena in a mobile communication terminal.

It is another object of the present invention to provide a reception diversity apparatus and method of a mobile communication terminal, for improving a link quality between a base station and a mobile communication terminal.

It is still another object of the present invention to provide a reception diversity apparatus and method for obtaining a GPS diversity effect in a mobile communication terminal.

To achieve the above and other objects, there is provided a diversity apparatus for a mobile communication terminal with a GPS function. The diversity apparatus comprises: at least two multiband antennas, each receiving a combined RF signal of a GPS signal and a mobile communication signal;

and a switching diversity unit for selecting one of the RF signals received by the multiband antennas.

According to object aspect of the present invention, there is provided a diversity apparatus for a mobile communication terminal with a GPS function. The diversity apparatus comprises: a first multiband antenna with a first reception polarization characteristic, for receiving a combined RF signal of a GPS signal and a mobile communication signal; a second multiband antenna with a second reception polarization characteristic distinguished from the first reception polarization characteristic, for receiving a combined RF signal of a GPS signal and a mobile communication signal; and a switching diversity unit for selecting one of the RF signals received by the first and second multiband antennas.

Also provided is a diversity method for use in a mobile communication terminal with a GPS function. The diversity method comprises the steps of: receiving at least two RF signals in the combined form of a GPS signal and a mobile communication signal through at least two multiband antennas; detecting signal strengths of the received RF signals; comparing the detected signal strengths, and selecting the strongest RF signal among the received RF signals according to the comparison results; and processing the selected RF signal in an RF band.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

A mobile communication terminal according to an embodiment of the present invention includes two multiband antennas each of which receive both a GPS signal and a CDMA signal. The mobile communication terminal selects the stronger one of two signals received by the two multiband antennas, and transmits the selected signal to an RF receiver.

Figure 1:
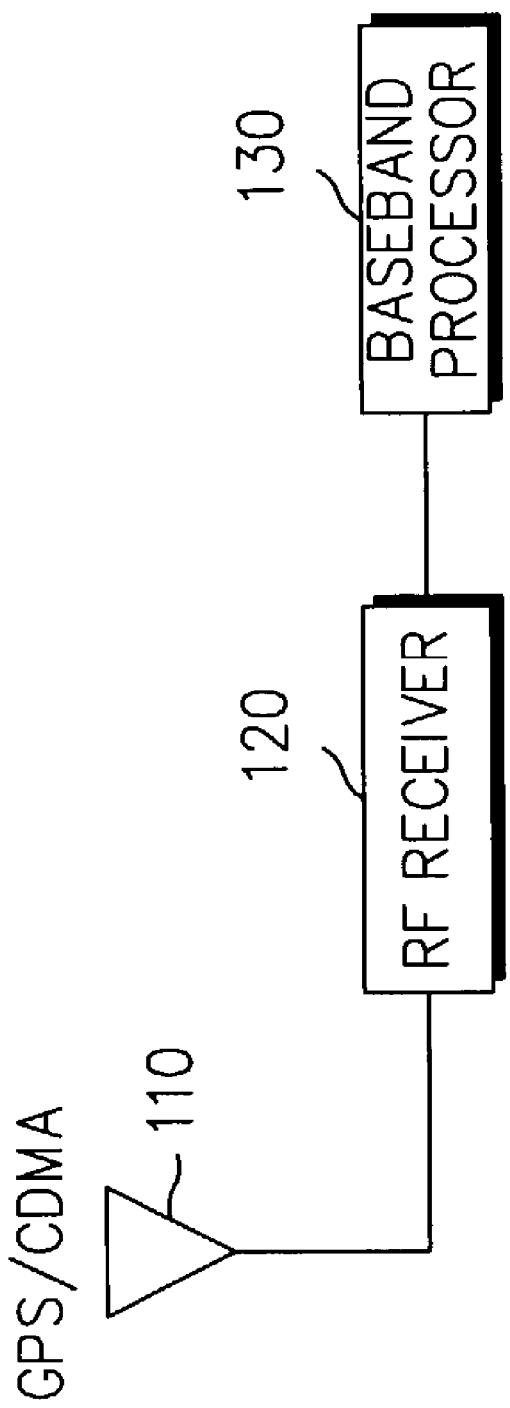
FIG. 1 is a block diagram illustrating a structure of a conventional CDMA mobile communication terminal receiver with a GPS function.
Figure 2:
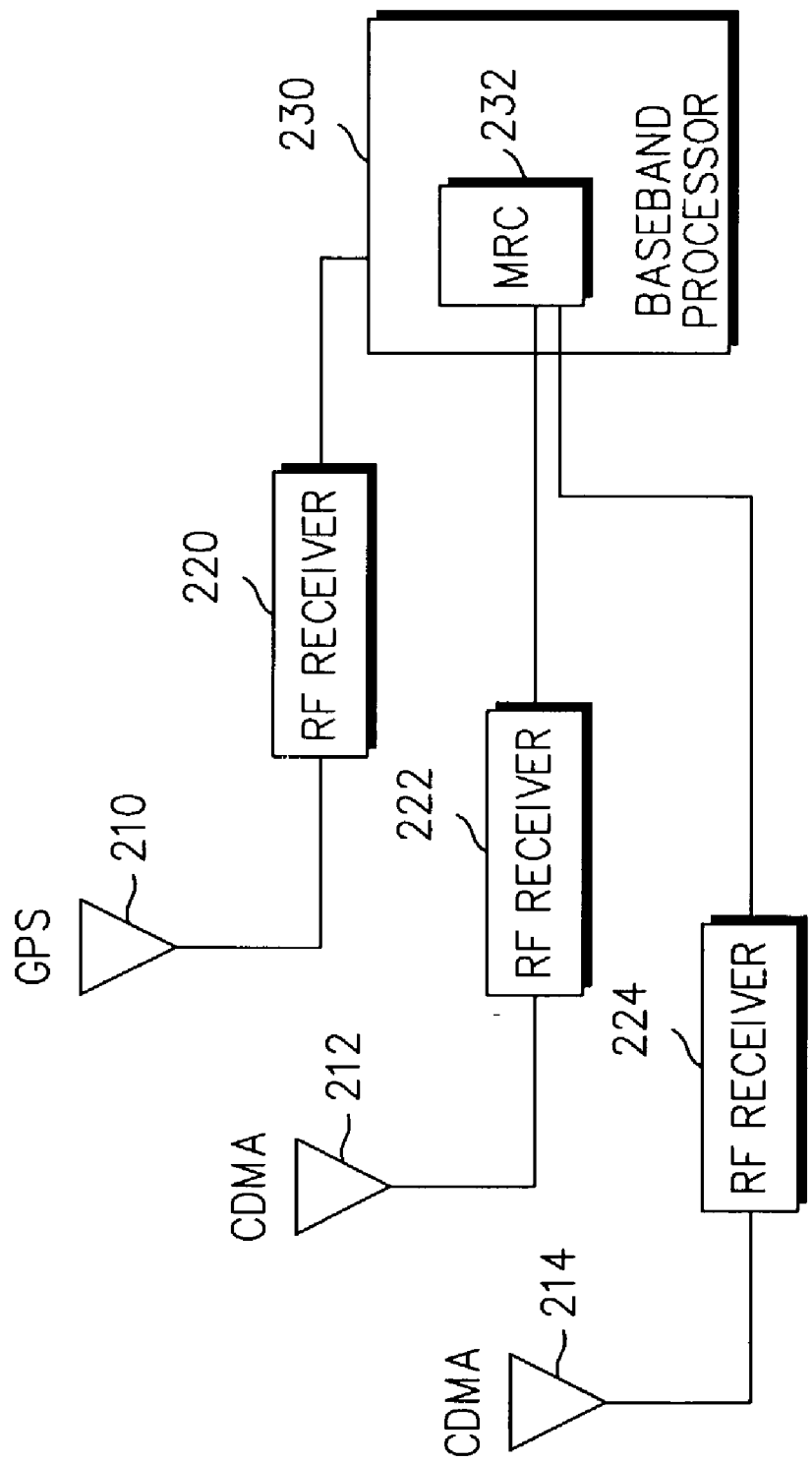
FIG. 2 is a block diagram illustrating a structure of a conventional CDMA mobile communication terminal receiver with GPS and diversity functions.
Figure 3:
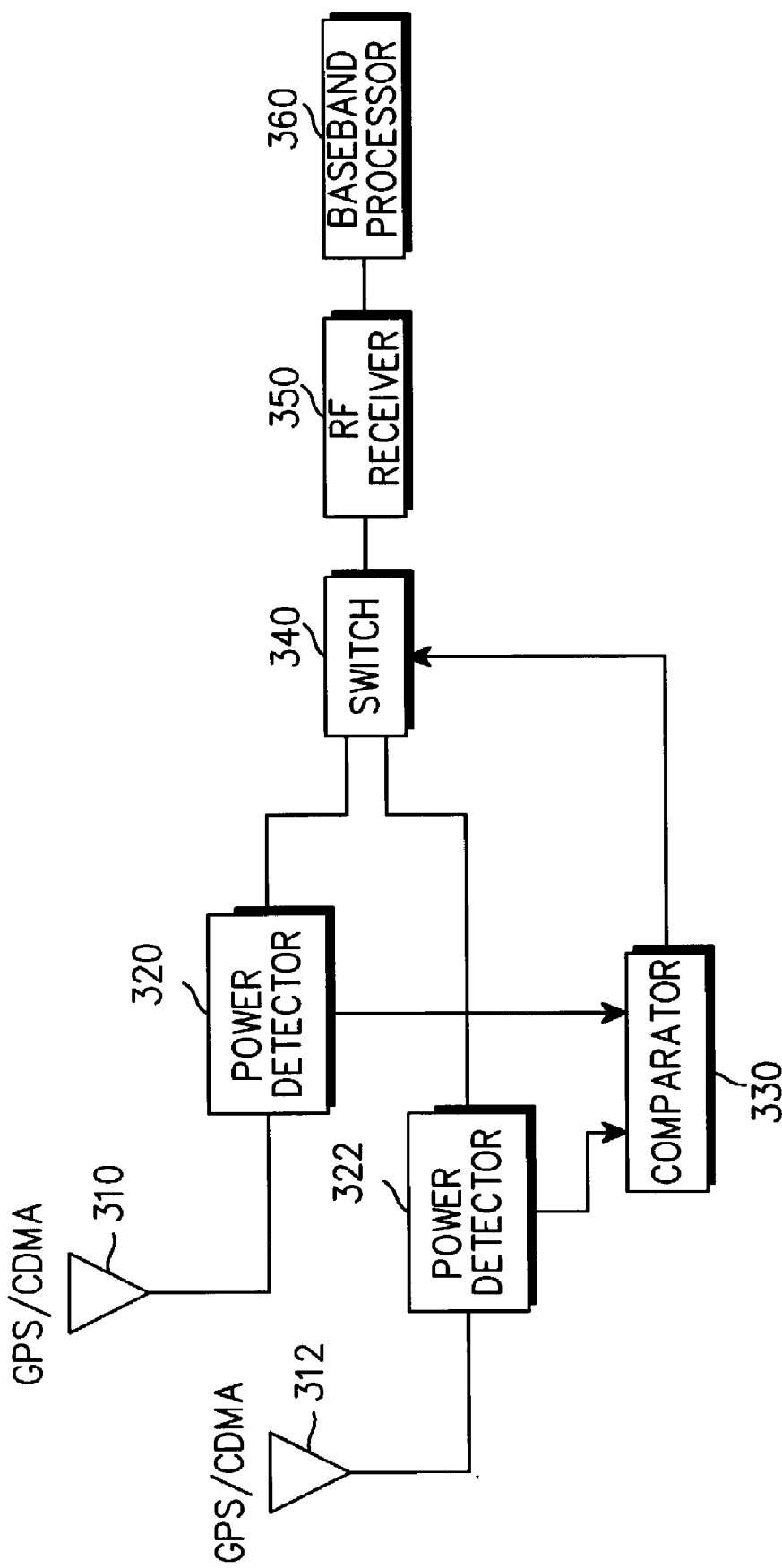
FIG. 3 is a block diagram illustrating a structure of a CDMA mobile communication terminal receiver with GPS and diversity functions according to an embodiment of the present invention.

FIG. 3 illustrates a structure of a CDMA mobile communication terminal receiver with GPS and diversity functions according to an embodiment of the present invention. As illustrated in FIG. 3, the mobile communication terminal comprises first and second GPS/CDMA multiband antennas 310 and 312, first and second power detectors 320 and 322, a comparator 330, a switch 340, a GPS/CDMA RF receiver 350, and a baseband processor 360.

Referring to FIG. 3, each of the first and second GPS/CDMA multiband antennas 310 and 312 receives a GPS RF navigation signal in a frequency band of 1575.42 MHz or 1227.6 MHz, and a CDMA RF signal in a frequency band of 900 MHz, 1.8 GHz, or 2 GHz. That is, each of the two GPS/CDMA multiband antennas 310 and 312 receives a combined RF signal of the GPS signal and the CDMA signals.

The first power detector 320 measures a first RSSI (Received Signal Strength Indicator) of the RF signal received by the first multiband antenna 310, and provides the first RSSI to the comparator 330. Similarly, the second power detector 322 measures a second RSSI of the RF signal received by the second multiband antenna 312, and provides the second RSSI to the comparator 330. The comparator 330 then compares the first RSSI with the second RSSI, and provides the switch 340 with a control signal for controlling the switch 340 according to the comparison results.

If the first RSSI is larger than the second RSSI, the switch 340 selects the RF signal provided from the first multiband antenna 310, and transmits the selected RF signal to the RF receiver 350. Otherwise, when the second RSSI is larger than the first RSSI, the switch 340 selects the RF signal provided from the second multiband antenna 312, and transmits the selected RF signal to the RF receiver 350. Here, the switch 340 can be embodied with a simple logic circuit outputting a 'HIGH' signal or a 'LOW' signal according to the comparison results on two input signals. The diversity technique of selecting the best out of many RF reception signals is called a switching diversity technique. Consequently, the mobile communication terminal receiver maintains a reception signal quality over a given level using the diversity technique.

The RF receiver 350 converts the GPS and CDMA RF signals included in the RF signal selected by the switch 340 into baseband signals. The baseband processor 360 extracts time and position information from the baseband GPS signal provided from the RF receiver 350, and processes the baseband CDMA signal provided from the RF receiver 350.

In the above-mentioned diversity device according to the present invention, the first and second antennas 310 and 312 are multiband antennas capable of receiving both the GPS RF signal and the CDMA RF signal. In this case, it is possible to obtain a space diversity effect by maintaining a given distance between the first and second antennas 310 and 312.

In addition, the first and second antennas 310 and 312 are designed to receive RF signals having different polarization characteristics. That is, the first antenna 310 has one or more first reception polarization characteristics, and the second antenna 312 has one or more second reception polarization characteristics distinguished from the first reception polarization characteristics.

The principle of the present invention is based on a combination of several polarized waves that are available and distinguishable from one another in a reception mode. It is well known by those skilled in the art that a polarization diversity technique provides several distinguishable reception channels, that is, one or more reception channels for a first polarized wave and one or more reception channels for a second polarized wave. Combining several polarized waves increases probability that the mobile communication terminal receiver will accurately receive a signal transmitted by a base station. The probability increase means a several-dB gain increase in the reception sensitivity respect, and the gain increase offsets an unfavorable effect induced by fading, interference and echo phenomena in a radio environment.

Needless to say, the first reception polarization characteristic of the first antenna 310 should have no relation to the second reception polarization characteristic of the second antenna 312 in order for the mobile communication terminal receiver to be able to obtain a reception diversity effect. In a preferred embodiment of the present invention, the first reception polarization wave is a linearly polarized wave, while the second reception polarization wave is a circularly polarized wave or an elliptically polarized wave. Here, the second reception polarization characteristic has a symmetric and dual polarization characteristic. In the preferred embodiment, the mobile communication terminal receiver can obtain three distinguishable polarization waves, thereby maximizing the reception diversity effect.

As described above, the present invention maximizes GPS and CDMA reception diversity effects by adding simple circuits (i.e., power detectors and a comparator) to GPS/CDMA mobile communication terminal antennas. Moreover, applying of the present invention to a mobile communication terminal increases a network channel capacity and a data rate, thereby enabling high-speed data communication.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A diversity apparatus for a mobile communication terminal with a GPS (Global Positioning System) function, comprising:
   at least two multiband antennas each receiving a combined RF (Radio Frequency) signal of a GPS signal and a mobile communication signal;
   a switching diversity unit for selecting one of the RF signals received by the multiband antennas; and
   an RF receiver for processing the selected RF signal from the switching diversity unit.

2. The diversity apparatus as claimed in claim 1, wherein the switching diversity unit comprises:
   at least two power detectors for detecting signal strengths of the RE signals received by the associated multiband antennas;
   a comparator for comparing the signal strengths detected by the power detectors, and generating a control signal for selecting the strongest RF signal among the received RF signals according to the comparison results; and
   a switch for selecting one of the received RF signals in response to the control signal generated by the comparator; wherein
   the RF receiver processes the selected RF signal.

3. The diversity apparatus as claimed in claim 1, wherein a first multiband antenna has a first reception polarization characteristic, and a second multiband antenna has a second reception polarization characteristic distinguished from the first reception polarization characteristic.

4. The diversity apparatus as claimed in claim 3, wherein the first reception polarization characteristic is a linear polarization, and the second reception polarization characteristic is a circular polarization.

5. The diversity apparatus as claimed in claim 1, wherein the multiband antennas are positioned at intervals of a given distance so as to obtain a space diversity effect.

6. The diversity apparatus as claimed in claim 1, wherein the RF receiver divides the selected RF signal into the GPS signal and the mobile communication signal, and processes the divided GPS signal and the divided mobile communication signal separately.

7. The diversity apparatus as claimed in claim 3, wherein the first reception polarization characteristic is a linear polarization, and the second reception characteristic is an elliptical polization.

8. The diversity apparatus as claimed in claim 2, wherein the RF receiver can obtain three distinguishable polarization waves.

9. A diversity apparatus for a mobile communication terminal with a GPS (Global Positioning System) function, comprising:
   a first multiband antenna with a first reception polarization characteristic, for receiving a combined RF signal of a GPS signal and a mobile communication signal;
   at least one second multiband antenna with a second reception polarization characteristic distinguished from the first reception polarization characteristic, for receiving a combined RF signal of a GPS signal and a mobile communication signal;
   a switching diversity unit for selecting one of the RF signals received by the first and second multiband antennas; and
   a receiver and a baseband processor for processing the selected RF signal output from the switching diversity unit in an RF band.

10. The diversity apparatus as claimed in claim 9, wherein the first reception polarization characteristic is a linear polarization, and the second reception polarization characteristic is a circular polarization.

11. The diversity apparatus as claimed in claim 9, wherein the switching diversity unit comprises:
    a first power detector for detecting a signal strength of the RF signal received by the first multiband antenna;
    a second power detector for detecting a signal strength of the RF signal received by the second multiband antenna;
    a comparator for comparing the signal strengths detected by the first and second power detectors, and generating a control signal for selecting a strongest RF signal among the received RF signals according to the comparison results; and
    a switch for selecting one of the received RF signals in response to the control signal generated by the comparator; wherein
    the RF receiver process the selected RF signal.

12. The diversity apparatus as claimed in claim 9, wherein the first and second multiband antennas are positioned at intervals of a given distance so as to obtain a space diversity effect.

13. The diversity apparatus as claimed in claim 11, wherein the RF receiver divides the selected RF signal into the GPS signal and the mobile communication signal and processes the divided GPS signal and the divided mobile communication signal separately.

14. The diversity apparatus as claimed in claim 9, wherein the first reception polarization characteristic is a linear polarization, and the second reception characteristic is an elliptical polarization.

15. A diversity method for use in a mobile communication terminal with a GPS (Global Positioning System) function, comprising the steps of:

receiving at least two RF signals in the combined form of a GPS signal and a mobile communication signal through at least two multiband antennas;

detecting signal strengths of the received RF signals;

comparing the detected signal strengths, and selecting a strongest RF signal among the received RF signals according to the comparison results; and processing the selected RF signal output from a switching diversity unit in an RF band.

16. The diversity method as claimed in claim 15, wherein the selected RF signal is divided into the GPS signal and the mobile communication signal, and the divided GPS signal and the divided mobile communication signal are separately processed.

* * * * *